United States Patent [19]

Smithline et al.

[11] 4,272,825

[45] Jun. 9, 1981

[54] TEMPERATURE COMPENSATION OF TUNABLE ACOUSTIC OPTICAL FILTERS

[75] Inventors: Leonard M. Smithline; George J. Wolga, both of Ithaca, N.Y.

[73] Assignee: Lansing Research Corporation, Ithaca, N.Y.

[21] Appl. No.: 40,644

[22] Filed: May 21, 1979

[51] Int. Cl.³ .................... G02F 1/135; G02F 1/29; G05B 15/02
[52] U.S. Cl. .................... 364/571; 350/372; 350/358; 364/861
[58] Field of Search .................... 364/525, 571, 861; 350/147, 149, 358

[56] References Cited

U.S. PATENT DOCUMENTS

| | | | |
|---|---|---|---|
| 3,679,288 | 7/1972 | Harris | 350/149 |
| 3,687,521 | 8/1972 | Kusters | 350/149 |
| 3,701,583 | 10/1972 | Hammond | 350/149 |
| 3,701,584 | 10/1972 | Runge | 350/149 |
| 3,729,251 | 4/1973 | Hearn | 350/149 |
| 3,756,689 | 9/1973 | Hammond et al. | 350/149 |
| 3,944,335 | 3/1976 | Saito et al. | 350/149 X |
| 3,982,817 | 9/1976 | Feichtner | 350/149 |
| 4,052,121 | 10/1977 | Chang | 350/149 |

FOREIGN PATENT DOCUMENTS 2841316 4/1979 Fed. Rep. of Germany ........... 350/149

OTHER PUBLICATIONS

Chang, Noncollinear Acousto-Optic Filter with Large Angular Aperture, Applied Physics Letters, vol. 26, No. 7, Oct. 1, 1974, pp. 370-372.
Harris et al., CaMoO₄ Electronically Tunable Optical Filter, Applied Physics Letters, vol. 17, No. 5, Sep. 1, 1970, pp. 223-225.
Harris et al., Acousto-Optical Tunable Filter, Journal of the Optical Society of America, vol. 59, No. 6, Jun. 1969, pp. 744-747.

*Primary Examiner*—Felix D. Gruber
*Attorney, Agent, or Firm*—J. Stephen Yeo

[57] ABSTRACT

The heating of a tunable-acoustic optical filter (TAOF) results in a drift in the calibration of the TAOF as the acoustic-optical medium temperature varies. In practicing the invention, the TAOF is periodically locked to a reference wavenumber and a calibration correction is then derived and employed to keep the TAOF consistently accurate.

6 Claims, 6 Drawing Figures

FIG. 6

LASAR LOCK SOFTWARE

Subroutes:
        "fsyn" - sets synthesizer frequency to value in F
        "demod" - reads analog output of demodulator

```
99    "calsrch":X F;gsb "fsyn";dsp "calibration search"
      (load synthesizer with initial frequency)
100   moct;wtb 9,170240;wti 0,11;wti 4,50000;rdi 4→T
      (check threshold state to see if within center lobe)
101   if band (T,200)#200;mdec;gto "callock"
      (if within center lobe go to lock)
102   H+.01→H;-G→G;GH+X→X;if H≤=2;gto-3
      (If not within center lobe change frequency,
      continue search)
103   beep;dsp "HeNE laser off!";stp ;0→H;43.74→X;gto-4
      (If not within center lobe after 200 searches-error)
104   "callock"0→H;dsp "calibration lock";gsb "demod"
      (reset H for next run;
      read demodulator output into register D)
105   if asb(D)<16;gto "interpolate"
      (If D is sufficiently close to zero go to "interpolate")
106   X+D/4e5→X;X→F;gsb "fsyn"
      (If not, correct frequency)
107   gto -3
      (Go back 3 steps)
108   "interpolate";ina D;wait 500;for N=1 to 15
109   gsb "demod"
110   D+D[1] D[1];next N
111   F+.003 F;gsb "fsyn"
112   wait 500;for N=1 to 15
113   gsb "demod"
114   D+D[2]→D[2];next N
115   (X+.003D[1]/(D[1]-D[2]))/43.72046→Y
116   "endcal":fxd 9;prt Y;ret
```

Steps 108-116 Interpolation section: Demodulator output
      measured 15 times and averaged at two frequencies.
      Zero crossing frequency determined using linear
      interpolation. Correction factor computed and
      stored in Y.

TEMPERATURE COMPENSATION OF TUNABLE ACOUSTIC OPTICAL FILTERS

BACKGROUND OF THE INVENTION

This invention relates to tunable acoustic-optical filters and is more particularly concerned with electronically tuning acoustic-optical filters.

Tunable acousto-optical filters (TAOF) utilize the interaction of light and acoustic beams in an optically anisotropic medium. A narrow band of light is selected to be passed or rejected. The center wavelength of the band is a function of the acoustic wave frequency.

The optically anisotropic medium allows propagation of both optical and acoustic beams. The medium is usually a birefringent crystal having a particular orientation with respect to the vectors of the optical and acoustic beams.

The acoustic beam is launched into the medium by a transducer or coupling means and travels through the medium as waves. As a peak of the acoustic wave passes through the medium, it locally perturbs or distorts the small scale geometry of the medium, causing changes in its optical properties. One band of optical frequencies will be most strongly affected by the changes in the medium induced by the acoustic wave. The affected band may be distinguished from the remainder of the optical spectrum by additional elements of the filter, such as polarizers, which may be arranged to either pass or reject the band while having the opposite effect on other frequencies.

TAOF's are classified as being collinear or non-collinear. The acoustic and the optical waves each has group velocity vectors and phase velocity vectors which are not necessarily aligned. In a collinear filter, the phase velocity vector of the acoustic-wave is collinear with the optical wave propagation.

A detailed description of a collinear TAOF is given in U.S. Pat. No. 3,679,288 granted to S. E. Harris. Light to be filtered is first linearly polarized before entering the medium as an extraordinary wave. A transducer induces an acoustic wave through the medium. Light at a frequency related to the acoustic frequency is diffracted into a polarization orthogonal to the polarization at the input. A polarization analyzer discriminates between the affected frequencies and other frequencies.

The relations between the center of the affected optical band and the acoustic frequency is given by Harris as:

$$\lambda_o = \frac{V_a \Delta \eta}{f_a}$$

where:
$f_a$ is the acoustic frequency
$\lambda_o$ is the wavelength of the center of the band,
$\Delta \eta$ is the birefringence of the material, and
$V_a$ is the acoustic velocity in the medium I. C. Chang in U.S. Pat. No. 4,052,121 describes a non-collinear filter having the approximate relation $$\lambda_o = \frac{V_a}{f_a} \left\{ (\Delta \eta)^2 + \left( \frac{\delta \Delta \eta}{\delta \theta_i} \right)^2 \right\}^{\frac{1}{2}}$$

I. C. Chang, at pages 370–372, Applied Physics Letters, Vol. 25, No. 7, Oct. 1, 1974, gave as a general relationship:

$$\lambda_o = \frac{V_a \Delta \eta}{f_a} (\sin^4 \theta_i + \sin^2 2\theta_i)^{\frac{1}{2}}$$

Saito et al in U.S. Pat. No. 3,944,335 gave a relationship which yields:

$$\lambda_o = \frac{V_a \Delta \eta \sin\theta}{f_a}$$

In these last three relationships $\theta_i$ is the angle of the light beam with respect to an axis of the medium.

If $\theta_i$ is constant, these relations reduce to:

$$\lambda_o = \frac{V_a \Delta \eta}{f_a} \cdot C$$

C is a constant $$f_a = \frac{V_a \Delta \eta}{\lambda_o} \cdot C$$

C is a constant

Three tuning curves are plotted in FIG. 1 and were originally based on the above relationships.

One curve is from Harris U.S. Pat. No. 3,679,288 for a collinear filter having $LiNbO_3$ as the anistropic medium.

The second curve is for a collinear $CaMoO_4$ filter from the work of S. E. Harris and S. T. K. Nieh, pages 223–225 of Vol. 17, No. 5 of Applied Physics Letters Sept. 1, 1970.

The third curve, from I. C. Chang, U.S. Pat. No. 4,052,121, is for a non-collinear $TeO_2$ filter.

The scale of the acoustic wave frequency is different for each curve, so as to better demonstrate the similarity of the curves when normalized. It will also be observed that the acoustic frequency may be at radio frequencies, and is not to be confused with audible sounds.

In addition to the theoretical relations previously stated, a known empirical relationship which approximately fits actual tuning curves is:

$$f_a = A/\lambda_o - B$$

wherein A and B are determined by the acoustic velocity in the medium, $V_a$, and the birefringence of the medium, $\Delta \eta$. Both parameters, particularly birefringence, change with temperature. Since $V_a$ and $\Delta \eta$ are temperature dependent, the tuning curve tends to shift and change shape as the medium heats. Thus, a tuning curve obtained at a given temperature will give inaccurate results at other temperatures.

Temperature changes in the TAOF medium are to be expected. Acoustic transducer inefficiencies, conversion of acoustic energy to heat by losses in the medium and absorption by an acoustic load, as well as the effect of ambient temperature, contribute to heating the medium. It is difficult to directly measure the effective medium temperature. There also may be a thermal gradient across the medium.

One object of the invention is to temperature compensate a TAOF.

An additional object is to obtain a tuning relationship corrected for the effective temperature of the medium of a TAOF.

Another object is to determine the acoustic frequency corresponding to the center wavelength of an optical band at a reference condition and to utilize said acoustic frequency to provide a temperature corrected tuning curve.

SUMMARY OF THE INVENTION

The invention includes apparatus and method for measuring thermal effects on the tuning curves of tunable acoustic-optical filters. A monochromatic light source illuminates the input of the TAOF. The TAOF has an optical band, the center wavenumber of which is determined by the frequency of an acoustic beam. The output of the TAOF is detected and a signal corresponding to the optical intensity is obtained. The frequency of the acoustic beam is varied until the signal is maximized. The acoustic frequency at this point is compared to that obtained at a reference condition. Any change in acoustic frequency is the result of temperature changes in the TAOF.

In keeping with another aspect of the invention, the change in acoustic frequency, for the same optical wavenumber, is used in the calculation of a new tuning curve, which is corrected for TAOF temperature.

BRIEF DESCRIPTION OF THE DRAWINGS

FIG. 6 is that portion of a computer program relevant to the invention.

DETAILED DESCRIPTION OF THE INVENTION

This invention will be described with a bandpass type of tunable acoustic-optical filter (TAOF) used as an example. The bandpass filter currently finds more applications than the band reject TAOF. It is to be understood that the following apparatus and method are suitable for both bandpass and bandreject filters. In the case of the bandpass filter, the intensity of the transmitted light, or throughput, is monitored. Rejected light may be monitored in the case of a bandreject filter. Furthermore, a known bandpass collinear TAOF using CaMoO$_4$ as a anisotropic medium will be referred to. This type of filter was first described by Harris (S. E. Harris, S. T. K. Nieh, and R. S. Feigelson, "CaMoO$_4$ Electronically Tunable Optical Filter", Applied Physics Letters, Vol. 17, No. 5, pp. 223–225.). Other types of TAOF's, both collinear and non-collinear, and fabricated from any suitable medium material, may be used in practicing this invention.

It is desirable to have the capability to tune the TAOF to a predetermined optical frequency using the acoustic frequency as the independent variable.

Figure 1:
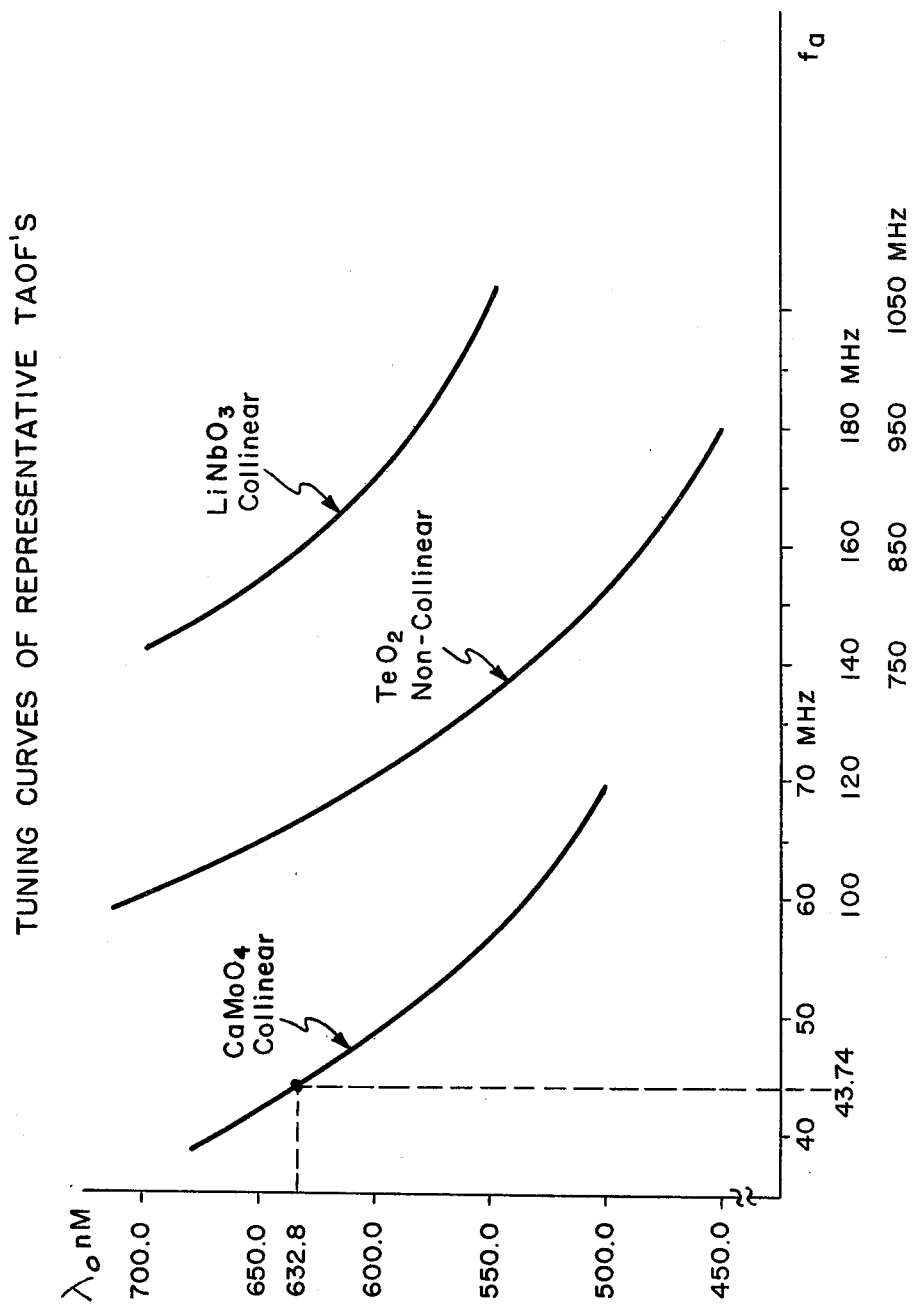
FIG. 1 shows the approximate tuning curves of three types of tunable acoustic optical filters.

Three tuning curves for different types of TAOF's were reproduced in FIG. 1. These curves, if expanded and plotted accurately, would be correct for only one temperature of the medium, which will be called the reference temperature.

By practicing the disclosed apparatus and method, an accurate correction may be made to the tuning curve for a varying effective temperature of the medium.

A previously known empirical approximation between frequency $f_a$ and the center wavelength of the passband was earlier given as $$f_a = A/(\lambda_o - B) \tag{1}$$

where A and B are temperature dependent. For a CaMoO$_4$ collinear filter, published values are A=15.25 and B=0.284 where $f_a$ is in MHz and $\lambda_o$ is in micrometers. These are only approximate values of A and B. An accurate tuning curve relationship at reference condition should be derived for the particular type of TAOF used.

It will be convenient to replace the optical wavelength $\lambda_o$ by its corresponding wavenumber $\overline{v_o}$, resulting in the relationship $$f_a = \frac{A\overline{V_o}}{1 - B\overline{V_o}} \tag{2a}$$

Since A and B are dependent on temperature T, $$f_a = F(\overline{V_o}, T) = \frac{\overline{V_o}A(T)}{1 - \overline{V_o}B(T)} \tag{2b}$$

In practicing the invention first the effect of changes in temperature T of the TAOF is measured, and then, corrections to the tuning curve are applied to compensate for any change from a reference condition.

I. MEASUREMENT OF TEMPERATURE EFFECTS

Direct measurement of T is quite difficult from a technical standpoint. Instead, a feature of this invention is to exploit the temperature dependence of the TAOF itself (2b) and measure the effects due to temperature variations. In keeping with the invention, this is done by using a monochromatic source as a standard which has only a single spectral line at a reference wavenumber $\overline{v_x}$. The single line prevents ambiguity in the procedure now to be described. The TAOF acoustic frequency which corresponds to $\overline{v_x}$ is $f_x$. If (2b) in monotonic and continuous with respect to T, a single-valued function $g(f_x) = T$ may be found, which is an inverse of (2b) with respect to temperature. The explicit dependence of (2b) on T may be replaced by a dependence on $f_x$.

$$f_a = F(\overline{V_o}, T) = H(\overline{V_o}, f_x) = \frac{\overline{V_o}A(g(f_x))}{1 - \overline{V_o}B(g(f_x))} \tag{2c}$$

It is first necessary to determine $f_x$. Either a manual or automatic technique may be used in keeping with the invention.

IA. MANUAL TECHNIQUE

Figure 2:
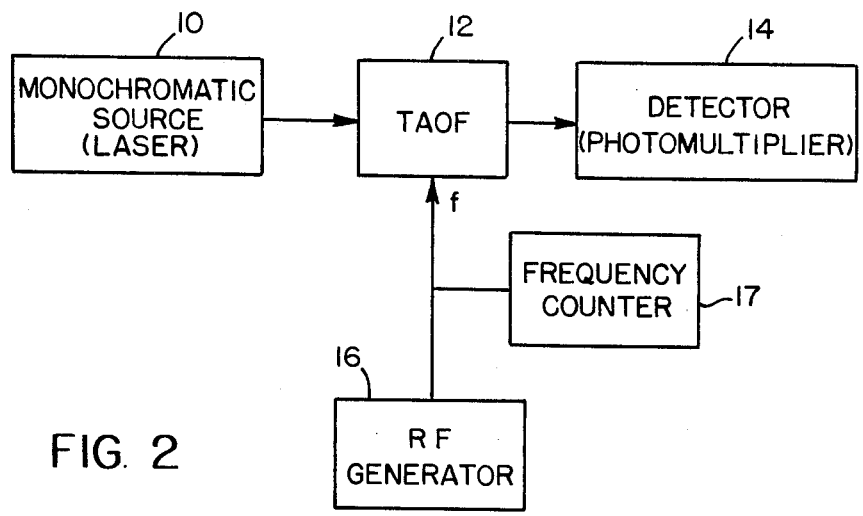
FIG. 2 is a block diagram of an arrangement allowing the manual determination of the acoustic frequency corresponding to a monochromatic standard.
Figure 4A:
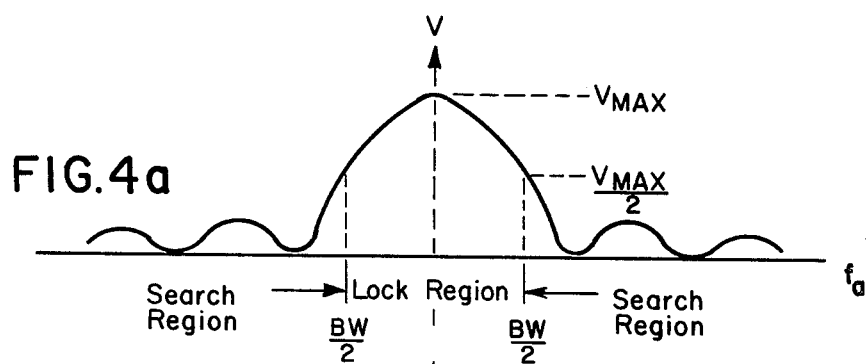
FIG. 4 shows curves of signals appearing in the arrangement of FIG. 3.

FIG. 2 shows the arrangement of a monochromatic source 10 such as a HeNe laser, a TAOF 12 and a photodetector 14 such as a photomultiplier. The photodetector is arranged at the output of the TAOF to provide an output signal proportional to and representative of the intensity of the transmitted light. An RF generator 16 is used to excite TAOF 12 with an acoustic wave or beam at a selected frequency $f_a$. The TAOF is tuned by varying $f_a$ until $f_a = f_x$. The output, $v$, of photodetector 14, is shown as a function of $f_a$ in FIG. 4a. The point of maximum light throughput corresponds to $f_x$. Acoustic frequency $f_a$ may be measured with a frequency counter 17, or alternatively, an accurate frequency synthesizer may be used to generate an acoustic beam at known frequencies.

IB. AUTOMATIC TECHNIQUE

Figure 3:
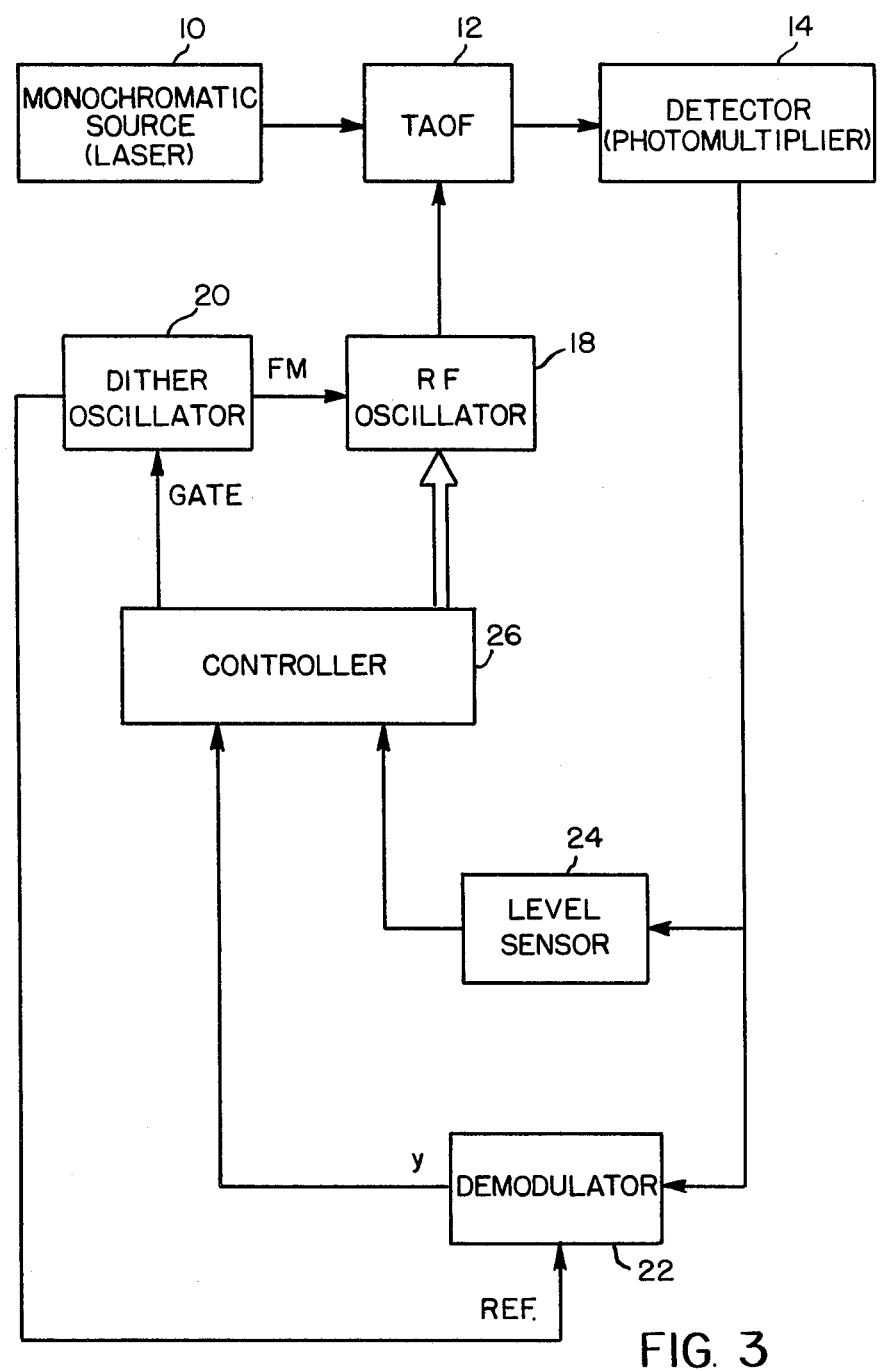
FIG. 3 is a block diagram of an arrangement for automatically determining the acoustic frequency corresponding to a monochromatic standard.
Figure 5:
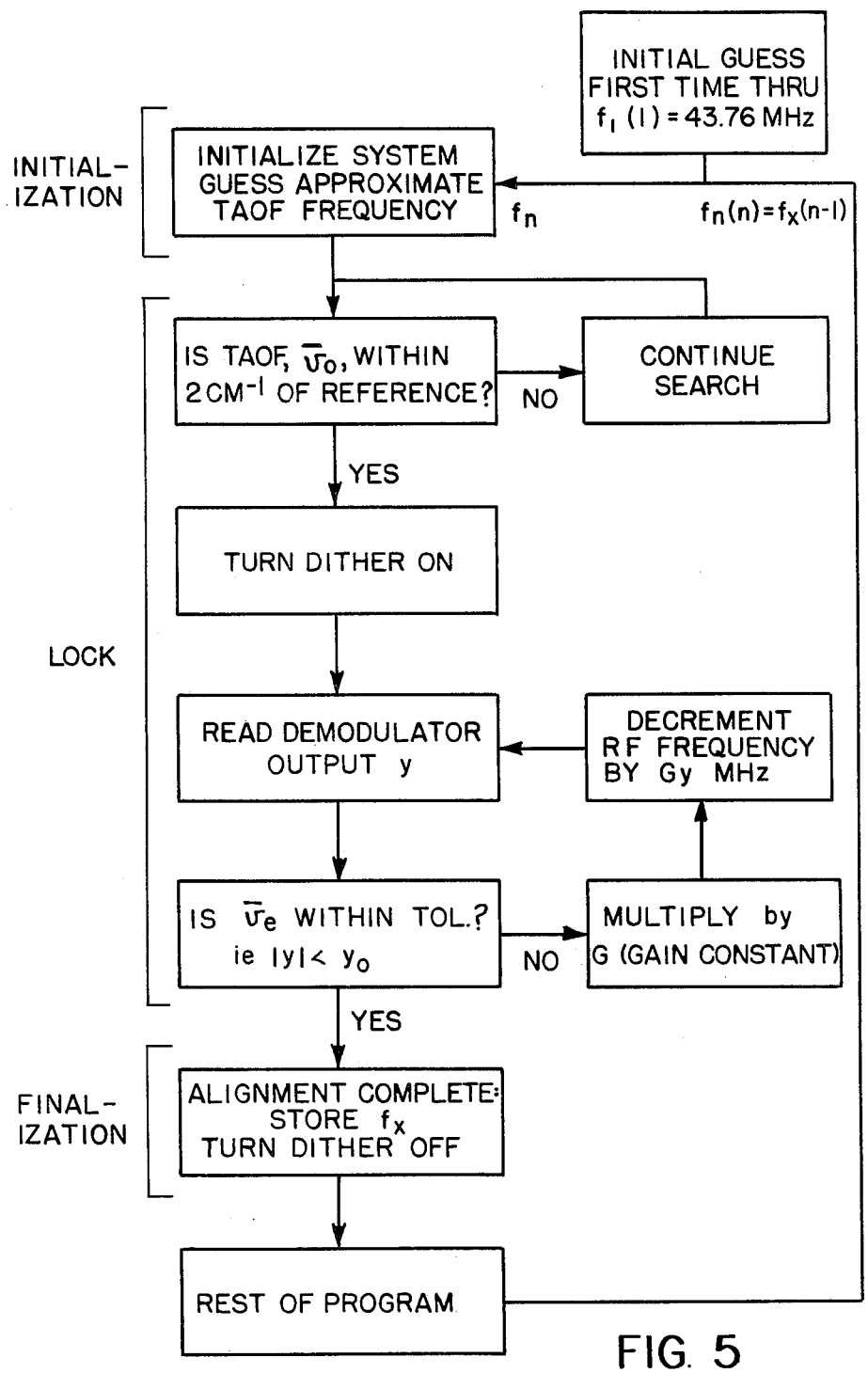
FIG. 5 is a flow chart showing the preferred procedure followed in the automatic determination of the acoustic frequency.

The determination of $f_x$ may also be done automatically using the system shown in FIG. 3 and the following procedure shown in FIG. 5. The arrangement of laser 10, TAOF 12 and photodetector 14, such as a photomultiplier is the same as for the manual procedure. A programmable RF oscillator 18 provides an RF signal which excites an acoustic beam in the TAOF at selected frequencies. A dither oscillator 20 is connected to the RF oscillator 18 to frequency modulate the RF signal and the resulting acoustic beam. A demodulator 22 and a level detector 24 are arranged to receive the output of photodetector 14. The sequence of operations is under the control of a controller 26. Controller 26 receives data from level sensor 24 and processes this data in accordance with a program. The photodetector 14 and elements 18, 20, 22, 24, 26 form a negative feedback loop. The system varies $f_a$ until the detector output signal $v$ is maximized. At this point $f_a = f_x$ and the central wavenumber of the TAOF, $\overline{v}_o$ is coincident with the reference wavenumber $\overline{v}_x$.

As seen in the flow chart of FIG. 5 there are four parts to the automatic determination of $f_x$. These parts are initialization, search, lock, and finalization.

i. Initialization—First, an initial guess at $f_x$ is made. It is denoted $f_1$, and may be arrived at in a number of ways, two of which are given below.
1. If the automatic calibration has been carried out before, the last previous value for $f_x$ is used. That is, on the nth time the calibration is run, $f_1(n) = f_x(n-1)$.
2. If the automatic calibration is being run for the first time (i.e. if the TAOF has been turned on for the first time) the value predicted for $f_x$ by the room temperature formula (1) is used. For a CaMoO$_4$ collinear TAOF at room temperature and HeNe laser ($\overline{\lambda}_x = 15,802$ cm$^{-1}$, $\lambda_x = 632.8$ nM), the value of $f_1$ is close to 43.74 MHz. Also, during the initialization phase, the search center (index k in part ii) is set to zero.

ii. Search—The purpose of the search is to bring $f_1$ close enough to $f_x$ so that reference wavenumber $\overline{v}_x$ falls within the TAOF's passband as opposed to a side lobe. (Refer to FIG. 4a). Lock (part iii) can then be executed. If $f_1$ is too far from $f_x$, it is possible to get false indications of lock, such as locking to a subsidiary maximum of a side lobe. In practice, using the half-amplitude criterion to be described is a safe choice. The limit $v_{max/2}$ is chosen to provide a safety factor for normal tolerances and improved response time. It is only necessary that $v_{max/2}$ exceed the first side lobe voltage which is theoretically 0.11 $V_{max}$.

The closeness of $f_1$ to $f_x$ may be ascertained by monitoring the photodetector output voltage, $v$. When $v > v_{max/2}$, $|f_1 - f_x| < BW/2$. BW is the half-amplitude bandwidth and $v_{max}$ is the output of the photodetector when $f_1 = f_x$.

The level sensor 24 used to monitor $v$ may be a comparator having a threshold of $v_{max/2}$. New acoustic frequencies are tried systematically until $f_1$ is close enough to $f_x$ for $v$ to exceed $v_{max/2}$, using the following preferred sequence:

$$f_1, f_1 + \Delta f, f_1 - \Delta f, f_1 + 2\Delta f, f_1 - 2\Delta f \ldots \tag{3}$$

The value of the acoustic frequency increment, $\Delta f$, is chosen such that $$\Delta f \frac{\partial \overline{V}}{\partial f} < BW/2 \tag{4}$$

This insures that the steps will be small enough not to skip over the point for which $v$ is greater than 0.5 $v_{max}$. For a CaMoO TAOF at 15,802 cm$^{-1}$, a $\Delta f$ equal to, or less than 10 KHz satisfies (4). In general the kth frequency is:

$$f_1 - \frac{k}{2} \Delta f \quad \text{for } k \text{ even} \tag{5a}$$

for k even (5a)

$$f_1 + \frac{(k+1)}{2} \Delta f \quad \text{for } k \text{ odd} \tag{5b}$$

for k odd (5b)

Figure 4B:
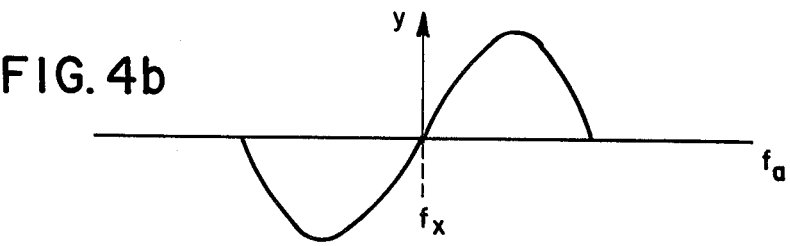

The effect of this is to search in ever increasing "circles" starting from the best guess, thereby keeping the search time to a minimum.

iii. Lock—When $v$ is greater than 0.5 $v_{max}$, $\overline{v}_x$ falls within the TAOF's passband, the search terminates, and the lock begins to align the center wavenumber of the band $\overline{v}_o$ with $\overline{v}_x$. The dither oscillator 20 is turned on by controller 26 and frequency modulates the acoustic beam. The dither oscillator 20 also supplies a reference a.c. signal to the phase sensitive demodulator 22. The output of the demodulator 22, y, is shown in FIG. 4b.

The lock mode continues until $|y|$ is less than $y_o$, an error criterion which depends on $v_e$, the allowable error in $v$.

$$\overline{V}_e \frac{\partial y}{\partial V} \geq y_o$$

For a $$\frac{\partial y}{\partial V} = 0.18 \text{ volts/cm}^{-1} \text{ and } \overline{V}_e = 0.125 \text{cm}^{-1},$$

$y_o$ is less than 22.5 mV.

The loop found in the lock cycle is a digital filter. Although many digital filters are possible, the simplest is a digital integrator which subtracts (for negative feedback) a value from f of Gy where G is the gain of the integrator. Thus, the sequence of frequencies is:

$$f_1 = \text{First frequency after search initialization} \tag{7}$$
$$f_2 = f_1 - (f_1 - f_x)K$$
$$f_3 = f_2 - (f_2 - f_x)K$$

-continued $$f_N = f_{N-1} - (f_{N-1} - f_x)K$$
$$= (f_1 - f_x)(1 - K)^{N-1} + f_x$$

where K is the loop gain $$K = G \cdot \frac{\partial y}{\partial \bar{\nu}} \cdot \frac{\partial \bar{\nu}}{\partial f}$$

$$\frac{\partial \bar{\nu}}{\partial f}$$

is the tuning sensitivity of the TAOF. It varies only slightly ($<<1\%$) with temperature, and may be assumed to be a constant for purposes of the control loop.

$$\frac{\partial y}{\partial \bar{\nu}}$$

is the gain of the demodulator which does not vary with TAOF crystal temperature. For stability, it is necessary that $|1-K|$ be less than 1. When this is true, the error $(f_N-f_x)$ goes to zero as indicated by the first term on the right-hand side of (7). For rapid convergence of f to $f_x$, K should be close to 1.

When the demodulator output, y, falls within the acceptable range, $|y|<y_o$, the lock cycle stops and $y=y_1$. The center wavenumber of the TAOF, $\bar{\nu}_o$, is then in close coincidence with the reference wavenumber $\bar{\nu}_x$. The acoustic frequency is $f_{x1}$ which is a good approximation of $f_x$.

A better estimate of $f_x$ may be obtained using the following interpolation procedure:
1. Note the frequency, $f_{x1}$, corresponding to $y_1$.
2. Shift the frequency a small amount, $\delta f$. The shift should be small enough so that one remains on the linear portion of the y vs. f demodulator tuning curve (FIG. 4b). A $\delta f=1$ KHz, which corresponds to a $\frac{1}{3}$ cm$^{-1}$ shift, is suitable for a CaMoO$_4$ filter.
3. Measure the demodulator output $y_2$ at $f=f_{x1}+\delta f$
4. Compute $f_x$ using the following interpolation formula:

$$f_x = f_{x1} - \frac{y_1 \delta f}{y_2 - y_1}$$

iv. Finalization—Once $f_x$ is determined, it is stored in a digital memory which may be internal to controller 26 for use in subsequent calculations. Also, during the finalization step, the dither oscillator is turned off so the acoustic frequency $f_x$ is held constant at the point of coincidence.

II. CORRECTION FOR TEMPERATURE

Recall that $$f_a = F(\bar{\nu}_o, T) = \frac{\bar{\nu}_o A(g(f_x))}{1 - \bar{\nu}_o B(g(f_x))} \quad (2c)$$

The correction formulas are the dependencies of A and B on T. The dependencies of A and B on $f_a$ may be found directly since $g(f_x)=T$.

The correction formulas preferably take the form of polynomial expansions.

$$A = \sum_{i=0, \text{integers}} a_i f_x^i \quad (8a)$$

$$B = \sum_{i=0, \text{integers}} b_i f_x^i \quad (8b)$$

The exact nature of the correction formula depends on the accuracy requirements and the allowable complexity.

An alternative to the empirical method of determining A and B by fitting curves to data, is to perform a correction based on a formula which describes the underlying physical cause of the thermal drift. The known relationship between acoustic frequency and optical wavelength is $$f_a = \frac{V_a \Delta \eta}{\lambda_o} \quad (9)$$

where $V_a$ is the acoustic velocity and $\delta \eta$ is the birefringence of the medium. The primary temperature dependence is exhibited by $\delta \eta$. Therefore, we can get in indication of the temperature effects on $\delta \eta$ by measuring $f_x$ and ratioing it with $f_x^*$.

$$\frac{f_x}{f_x^*} = \frac{\Delta \eta}{\Delta \eta^*} \quad (10)$$

where the starred variables indicate their values at a reference temperature, $T^*$.

Equation (1) then becomes:

$$f^* = \frac{A^*}{\lambda - B^*} \quad (11)$$

Values representing the tuning curve at its reference temperature are stored in the memory of controller 20. To get the desired acoustic operating frequency, f, at any temperature, one scales $f^*$ corresponding to the desired wavenumber by the ratio $f_x/f_x^*$.

$$f = f^* \frac{\Delta \eta}{\Delta \eta^*} = f^* \frac{f_x}{f_x^*} \quad (12)$$

For a HeNe reference and a CaMoO$_4$ TAOF, $f_x^*=43.74$ MHz at room temperature. $f_x$ can be calculated by controller 26 in accordance with equations (11) and (12).

$$f = \frac{A^*}{\lambda - B^*} \cdot \frac{f_x^*}{43.74 \text{MHz}}$$

In terms of (8) this correction may be expressed $$b_o = B^*, a_o = 0$$
$$a_1 = A^*/43.74\text{MHz}$$
$$b_1 = 0$$

All other $a_i$, $b_i=0$

In practicing this invention a Hewlett Packard HP 9825A controller was used. FIG. 6 is that portion of a computer program, in HP language, which is relevant to the invention.

A number of refinements may be made keeping with the invention. As an example, more than one reference wavelength may be used. A CaMoO₄ TAOF is tunable over the range of 450 nM-740 nM. Numerous distinct spectral lines may be spaced over this range so that any change in the shape of the curve will be compensated.

Furthermore, a single tuning curve relationship may not adequately define the actual tuning curve over the entire frequency range of the TAOF. Greater accuracy may be obtained by dividing the operating range of the TAOF into two or more bands. An optimized tuning curve relation for each band of interest may be derived. A reference wavenumber falling within each band of interest may be provided. For this purpose, a number of sources, each corresponding to a band, may be used.

ADVANTAGES OF THE INVENTION

Only one point is necessary to calibrate the tuning curve. A fairly accurate correction may be made by changing all the acoustic frequencies in proportion to the ratio of the acoustic frequencies corresponding to the reference wavenumber.

Neither is there a need to measure the TAOF temperature explicity. This eliminates the following problems:
(a) Temperature measurement is relatively difficult to implement from a technical standpoint.
(b) The temperature will differ across the TAOF medium.
(c) The expense of additional components.

The correction scheme, once set forth, is simple and may be based on a theoretical formula as well as an empirical formula. The result is reliable operation and general applicability.

The calibrated TAOF may be made to serve as a secondary standard over a broad spectrum of wavelengths.

In the following claims, the abbreviation TAOF represents tunable acoustic optical filters and their equivalents.

We claim:
1. Apparatus for measuring the effects of the temperature upon the tuning curve of a TAOF having a variable center wavenumber corresponding to the frequency of an acoustic beam which apparatus comprises:
   (a) at least one monochromatic source for providing light at a reference wavenumber to the optical input of the TAOF;
   (b) photodetector for means for providing a signal representing the intensity of light at an optical output of the TAOF;
   (c) means for providing a variable frequency acoustic beam to the TAOF;
   (d) means for varying the frequency of the acoustic beam in response to the signal representing the intensity of light from the TAOF until the signal is maximized by causing the center wavenumber of the TAOF to coincide with the reference wavenumber, and for holding the frequency of the acoustic beam constant at the point of coincidence; and
   (e) means for ratioing the frequency of the acoustic beam to the reference wavenumber at a reference TAOF temperature; whereas the acoustic frequency ratio is a function of the temperature of the TAOF.

2. Apparatus for compensating the tuning curve of a tuning curve being a temperature dependent relationship of the center wavenumber of the TAOF to the frequency of an acoustic beam, said apparatus comprising:
   (a) at least one monochromatic source for providing light at a reference wavenumber to the optical input of the TAOF;
   (b) photodetector means for providing a signal representing the intensity of light at an optical output of the TAOF;
   (c) means for providing a variable frequency acoustic beam to the TAOF;
   (d) means for varying the frequency of the acoustic beam to the TAOF in response to the signal representing the intensity of light from the TAOF until the signal is maximized by causing the center wavenumber of the TAOF to coincide with a reference wavenumber, and for holding the frequency of the acoustic beam constant at the point of coincidence; and
   (e) means for ratioing the frequency of the acoustic beam to the frequency of an acoustic beam corresponding to the reference wavenumber at a reference TAOF temperature, whereas the acoustic frequency ratio is a function of the temperature of the TAOF, and;
   (f) means for storing values representing a tuning curve relationship of the center wavelength of the TAOF and the frequency of an acoustic beam at a reference condition and for modifying said values by the acoustic frequency ratio relationship to correct for the temperature of the TAOF.

3. The apparatus of claims 1 and 2 wherein a plurality of monochromatic sources are provided for providing a corresponding number of different reference wavenumbers distributed along the tuning curve of the TAOF.

4. The apparatus of claims 1 or 2 wherein said means for varying the frequency of the acoustic beam in response to the signal representing the intensity of light from the TAOF until the signal is maximized by causing the central wavenumber of the TAOF to coincide with the reference wavenumber, and for holding the frequency of the acoustic beam constant at the point of coincidence includes level means for assuring that the level of said signal exceeds a predetermined minimum value at the point of coincidence thereby avoiding false coincidence due to TAOF sidelobes.

5. A method for measuring the effects of temperature upon the tuning curve of a TAOF having a variable center wavenumber corresponding to the frequency of an acoustic beam, which comprises the steps of:
   (a) providing light at at least one reference wavenumber to the optical input of the TAOF;
   (b) providing a signal representing the intensity of light at the optical output of the TAOF;
   (c) providing a variable frequency acoustic beam to the TAOF;
   (d) varying the frequency of the acoustic beam to the TAOF in response to the signal representing the intensity of light from the TAOF until the signal is maximized, at which point the center wavenumber of the TAOF coincides with the reference wavenumber;
   (e) holding a frequency of the acoustic beam constant at the point of coincidence; and
   (f) ratioing the frequency of the acoustic beam to the frequency of an acoustic beam corresponding to the reference wavenumber at a reference TAOF temperature; whereas the acoustic frequency ratio is a function of the temperature of the TAOF.

6. A method of compensating the tuning curve of a TAOF for variations in the temperature of the TAOF, said tuning curve being a relationship at a particular temperature of the center wavenumber of the TAOF to the frequency of an acoustic beam, comprising the steps of:
- (a) providing light at least one reference wavenumber to the optical input of the TAOF;
- (b) providing a signal representing the intensity of light at the optical output of the TAOF;
- (c) providing a variable frequency acoustic beam to the TAOF;
- (d) varying the frequency of the acoustic beam to the TAOF in response to the signal representing the intensity of light from the TAOF until the signal is maximized at which point the center wavenumber of the TAOF coincides with the wavenumber;
- (e) holding the frequency of the acoustic beam constant at the point of coincidence; and
- (f) ratioing the frequency of the acoustic beam to the frequency of an acoustic beam corresponding to a reference wavenumber at a reference TAOF temperature, whereas the acoustic frequency ratio is a function of the temperature of the TAOF; and
- (g) storing values representing a tuning curve relationship of the center wavelength of the TAOF and the frequency of an acoustic beam and modifying said values by the acoustic ratio to correct for the temperature, of the TAOF.

* * * * *